(12) United States Patent
Li et al.

(10) Patent No.: US 11,402,879 B2
(45) Date of Patent: Aug. 2, 2022

(54) COVER PLATE, METHOD FOR PREPARING THE SAME, DISPLAY PANEL, AND DISPLAY DEVICE

(71) Applicant: BOE TECHNOLOGY GROUP CO., LTD., Beijing (CN)

(72) Inventors: Jianwei Li, Beijing (CN); Yongxiang Shi, Beijing (CN); Paoming Tsai, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 258 days.

(21) Appl. No.: 16/621,132

(22) PCT Filed: May 13, 2019

(86) PCT No.: PCT/CN2019/086519
§ 371 (c)(1),
(2) Date: Dec. 10, 2019

(87) PCT Pub. No.: WO2019/242426
PCT Pub. Date: Dec. 26, 2019

(65) Prior Publication Data
US 2021/0365083 A1 Nov. 25, 2021

(30) Foreign Application Priority Data
Jun. 22, 2018 (CN) .......................... 201810652333.0

(51) Int. Cl.
*G06F 1/16* (2006.01)
*G06F 1/18* (2006.01)
(Continued)

(52) U.S. Cl.
CPC .............. *G06F 1/181* (2013.01); *C08J 7/042* (2013.01); *C08J 7/046* (2020.01); *G06F 1/1652* (2013.01); *G09F 9/301* (2013.01); *C08J 2383/04* (2013.01)

(58) Field of Classification Search
CPC ..................................................... G06F 1/1652
See application file for complete search history.

(56) References Cited

U.S. PATENT DOCUMENTS 9,823,699 B2 * 11/2017 Ko .......................... G06F 1/1652
10,334,750 B2 * 6/2019 Koo ..................... H04M 1/0214
(Continued)

FOREIGN PATENT DOCUMENTS

| CN | 106313835 A | 1/2017 |
|---|---|---|
| CN | 107482127 A | 12/2017 |

(Continued)

OTHER PUBLICATIONS

First Office Action for Chinese Application No. 201810652333.0, dated Feb. 6, 2020, 6 Pages.
(Continued)

*Primary Examiner* — Adrian S Wilson
(74) *Attorney, Agent, or Firm* — Brooks Kushman P.C.

(57) ABSTRACT

A cover plate, a method for preparing the same, a display panel, and a display device are provided. The cover plate has a bending zone and a non-bending zone, and the cover plate includes: a substrate layer and a hardened layer attached to the substrate layer, in which the hardened layer includes a first hardened layer portion located in the bending zone, the first hardened layer portion including a mixture of a flexible hardened material and a rigid hardened material.

14 Claims, 2 Drawing Sheets

(51) Int. Cl.
*C08J 7/046* (2020.01)
*C08J 7/04* (2020.01)
*G09F 9/30* (2006.01)

(56) References Cited

U.S. PATENT DOCUMENTS

| | | | |
|---|---|---|---|
| 10,520,978 B1* | 12/2019 | Li | G09G 3/20 |
| 2015/0043174 A1* | 2/2015 | Han | G06F 1/1652 |
| | | | 361/749 |
| 2015/0055308 A1* | 2/2015 | Lim | G04G 17/045 |
| | | | 361/749 |
| 2015/0220117 A1* | 8/2015 | Lee | G06F 1/1652 |
| | | | 361/749 |
| 2016/0014881 A1* | 1/2016 | Shin | G06F 1/1616 |
| | | | 361/749 |
| 2016/0357052 A1* | 12/2016 | Kim | H01L 51/5237 |
| 2019/0036076 A1* | 1/2019 | Tang | H01L 51/5256 |
| 2019/0132987 A1* | 5/2019 | Koo | H05K 5/0217 |
| 2019/0187752 A1* | 6/2019 | Lee | G06F 1/1641 |
| 2019/0207141 A1* | 7/2019 | Kim | H01L 51/524 |
| 2019/0355919 A1 | 11/2019 | Lu et al. | |
| 2020/0204662 A1* | 6/2020 | Lee | G06F 1/1652 |

FOREIGN PATENT DOCUMENTS

| | | |
|---|---|---|
| CN | 107765921 A | 3/2018 |
| CN | 108010445 A | 5/2018 |
| CN | 108615821 A | 10/2018 |
| CN | 108831305 A | 11/2018 |
| CN | 108984056 A | 12/2018 |
| CN | 208271483 U | 12/2018 |
| CN | 109377886 A | 2/2019 |
| CN | 208737441 U | 4/2019 |

OTHER PUBLICATIONS

International Search Report and Written Opinion for Application No. PCT/CN2019/086519, dated Aug. 8, 2019, 10 Pages.

* cited by examiner

US 11,402,879 B2

COVER PLATE, METHOD FOR PREPARING THE SAME, DISPLAY PANEL, AND DISPLAY DEVICE

CROSS-REFERENCE TO RELATED APPLICATIONS

This application is the U.S. national phase of PCT Application No. PCT/CN2019/086519 filed on May 13, 2019, which claims priority to Chinese Patent Application No. 201810652333.0 filed on Jun. 22, 2018, which are incorporated herein by reference in their entireties.

TECHNICAL FIELD

The present disclosure relates to the field of display technology, in particular, to a cover plate, a method for preparing the same, a display panel, and a display device.

BACKGROUND

Flexible display products have been developed and get people's attention, but current flexible display devices still have problems of insufficient flexibility. For example, when the flexible display device is bent at a small bending radius (for example, less than 3 mm), the bending zone of the flexible display device is prone to breakage, which greatly affects the appearance and reliability of the flexible display products. In addition, the current flexible display products are difficult to return to a flat state after dynamic bending or long-term static bending, which also greatly affects the comfort and reliability of the flexible display product.

SUMMARY

Embodiments of the present disclosure provide a cover plate, including a bending zone and a non-bending zone. The cover plate includes: a substrate layer and a hardened layer attached to the substrate layer, in which the hardened layer includes a first hardened layer portion located in the bending zone, the first hardened layer portion including a mixture of a flexible hardened material and a rigid hardened material.

According to some embodiments of the present disclosure, an upper surface and a lower surface of the substrate layer are each provided with the hardened layer, the first hardened layer portion includes a plurality of layers of flexible hardened material and a plurality of layers of rigid hardened material, the plurality of layers of flexible hardened material and the plurality of layers of rigid hardened material are arranged alternately on the substrate layer along an interface between the substrate layer and the hardened layer.

According to some embodiments of the present disclosure, the hardened layer further includes a second hardened layer portion located in the non-bending zone, the second hardened layer portion being formed of the rigid hardened material.

According to some embodiments of the present disclosure, the plurality of layers of flexible hardened material has a pencil hardness not greater than 7H, and the plurality of layers of rigid hardened material has a pencil hardness greater than 7H and not greater than 9H.

According to some embodiments of the present disclosure, the plurality of layers of flexible hardened material and the plurality of layers of rigid hardened material each include a composite formed of a siloxane polymer material and a resin material.

According to some embodiments of the present disclosure, the cover plate further includes an ink blocking layer attached to the hardened layer, the ink blocking layer including a first ink layer portion located in the bending zone, the first ink layer portion including a mixture of a flexible ink material and a rigid ink material.

According to some embodiments of the present disclosure, the first ink layer portion includes a plurality of layers of flexible ink material and a plurality of layers of rigid ink material, the plurality of layers of flexible ink material and the plurality of layers of rigid ink material are arranged alternately on the hardened layer along an interface between the ink blocking layer and the hardened layer.

According to some embodiments of the present disclosure, in a vertical direction perpendicular to the interface between the ink blocking layer and the hardened layer, the plurality of layers of flexible ink material in the ink blocking layer is aligned respectively with the plurality of layers of flexible hard material in the hardened layer, and the plurality of layers of rigid ink material in the ink blocking layer is aligned respectively with the plurality of layers of rigid hardened material in the hardened layer.

According to some embodiments of the present disclosure, the ink blocking layer further includes a second ink layer portion located in the non-bending zone, the second ink layer portion being formed of the rigid ink material.

According to some embodiments of the present disclosure, the plurality of layers of flexible ink material has an elastic modulus of 6 GPa to 7 GPa, and the plurality of layers of rigid ink material has an elastic modulus of 40 GPa to 60 GPa.

According to some embodiments of the present disclosure, the cover plate includes a display area, and the ink blocking layer is arranged at a periphery of the display area.

According to some embodiments of the present disclosure, the hardened layer is arranged on a surface of the substrate layer, and the cover plate further includes: an ink blocking layer attached to a side of the substrate layer facing away from the hardened layer, the ink blocking layer including a first ink layer portion located in the bending zone, the first ink layer portion including a mixture of a flexible ink material and a rigid ink material.

According to some embodiments of the present disclosure, the ink blocking layer further includes a second ink layer portion located in the non-bending zone, and the second ink layer portion being formed of the rigid ink material.

Another embodiment of the present disclosure provides a display panel including the cover plate of any of the above embodiments.

Another embodiment of the present disclosure provides a display device including the display panel as described in the above embodiment.

A further embodiment of the present disclosure provides a method for preparing a cover plate, including: providing a substrate layer including a bending zone and a non-bending zone; and forming a hardened layer on the substrate layer, in which the hardened layer includes a first hardened layer portion located in the bending zone, the first hardened layer portion including a mixture of a flexible hardened material and a rigid hardened material.

According to some embodiments of the present disclosure, the hardened layer is formed on the substrate layer by an evaporation process, and the method includes: evaporating a rigid hardened material on the bending zone and the non-bending zone of the substrate layer by using a first mask, the rigid hardened material on the non-bending zone of the substrate layer forms the second hardened layer portion of the hardened layer; and evaporating a flexible hardened material on the bending zone of the substrate layer by using a second mask, in which a pattern of the first mask is complementary to a pattern of the second mask.

The preparation method according to some embodiments of the present disclosure further includes: forming an ink blocking layer on the hardened layer, the ink blocking layer including a first ink layer portion located on the first hardened layer portion, the first ink layer portion including a mixture of a flexible ink material and a rigid ink material.

According to some embodiments of the present disclosure, the ink blocking layer includes a second ink layer portion located on the second hardened layer portion, in which the forming the ink blocking layer includes: printing the rigid ink material on the first hardened layer portion and the second hardened layer portion by using a first screen printing screen; and printing the flexible ink material on the first hardened layer portion by using a second screen printing screen, in which a pattern of the first screen printing screen is complementary to a pattern of the second screen printing screen.

DETAILED DESCRIPTION

The technical solutions in the embodiments of the present disclosure will be described hereinafter in conjunction with the drawings in the embodiments of the present disclosure in a clear and complete manner. Obviously, the following embodiments merely relate to a part of, rather than all of, the embodiments of the present disclosure. Based on these embodiments, a person skilled in the art may, without any creative effort, obtain the other embodiments, which also fall within the scope of the present disclosure.

Figure 1:
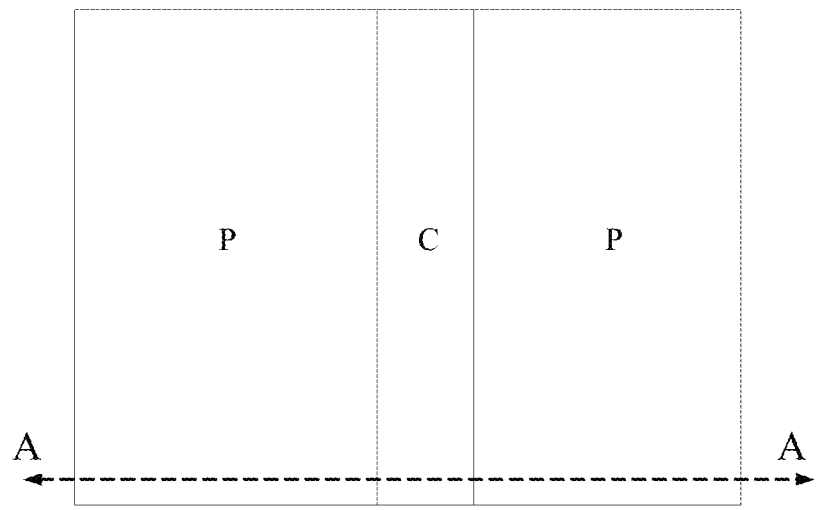
FIG. 1 is a schematic partial top view showing a cover plate provided according to an embodiment of the present disclosure.
Figure 2:
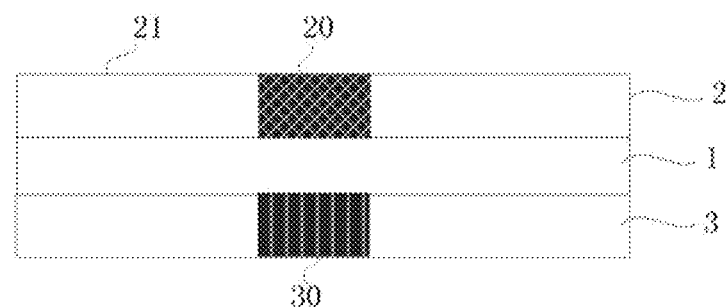
FIG. 2 is a cross-sectional view showing the cover plate shown in FIG. 1 along line A-A.

Embodiments of the present disclosure provide a cover plate applicable to a flexible display device. The cover plate has a bending zone and a non-bending zone, and includes: a substrate layer and a hardened layer attached to the substrate layer, in which the hardened layer includes a first hardened layer portion located in the bending zone, the first hardened layer portion including a mixture of a flexible hardened material and a rigid hardened material. FIG. 1 schematically shows a plan view of a cover plate according to an embodiment of the present disclosure, and FIG. 2 shows a cross-sectional view of the cover plate obtained along line A-A in FIG. 1. As shown in FIG. 1 and FIG. 2, the cover plate has a bending zone C and a non-bending zone P, and includes: a substrate layer 1 and a hardened layer 2 attached to the substrate layer 1, in which the hardened layer 2 includes a first hardened layer portion 20 located in the bending zone C, the first hardened layer portion 20 including a mixture of a flexible hardened material and a rigid hardened material.

The term "bending zone" as used herein refers to a zone in which the cover plate is suitable for bending, rather than a certain zone on the surface of the cover plate being always in a bent state, and the "non-bending zone" refers to a zone being not in a bent state under normal circumstances. The cover plate provided by the embodiment of the present disclosure can be applied to a flexible display device. Since the first hardened layer portion in the bending zone includes a mixture of the flexible hardened material and the rigid hardened material, the flexibility of the bending zone of the cover plate is improved. Thus, it is advantageous to prevent the cover plate from being broken at a small bending radius, and to improve the bending reliability of the cover plate and the flexible display device, so that the cover plate is more easily restored to a flat state after dynamic bending or static bending for a long time. At the same time, the rigid hardened material in the first hardened layer portion of the bending zone makes the hardness of the cover plate not greatly reduced, thereby realizing the protective function of the cover plate.

Figure 3:
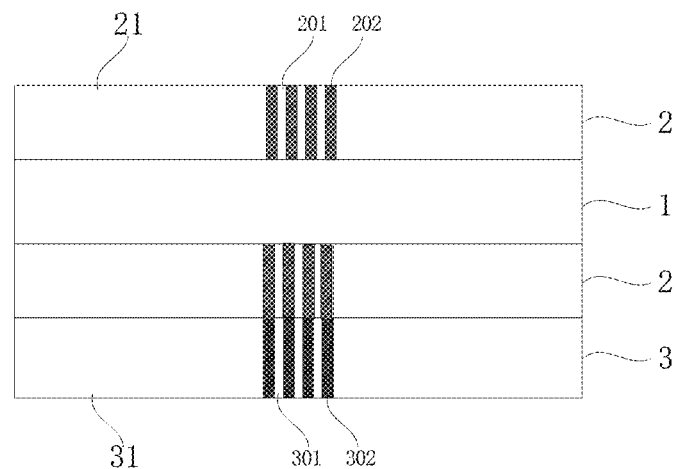
FIG. 3 is a partial cross-sectional view showing a cover plate provided according to another embodiment of the present disclosure.

FIG. 3 schematically shows a partial cross-sectional view of a cover plate according to another embodiment of the present disclosure. As shown in FIG. 3, the first hardened layer portion 20 of the hardened layer 2 of the cover plate includes a plurality of layers of flexible hardened material 202 and a plurality of layers of rigid hardened materials 201, in which the plurality of plurality of layers of flexible hardened materials and the plurality of plurality of layers of rigid hardened materials are alternately arranged on the substrate layer 1 along the interface between the substrate layer 1 and the hardened layer 2. In the example of FIG. 3, the upper and lower surfaces of the substrate layer 1 are each provided with a hardened layer 2, which is more advantageous for enhancing the strength and flexibility of the cover plate. As shown in FIG. 2 or FIG. 3, according to an embodiment of the present disclosure, the hardened layer 2 further includes a second hardened layer portion 21 located in the non-bending zone P of the cover plate, and the second hardened layer portion 21 being formed of the rigid hardened material. As such, it is possible to ensure that the overall cover plate has strong robustness and protects the display device to which the cover plate is applied. According to some embodiments of the present disclosure, the substrate layer 1 is a flexible transparent substrate layer 1, which may be formed of a flexible transparent material, such as polymethyl methacrylate (PMMA), polyethylene terephthalate (PET), polyimide (PI), polycarbonate (PC), or the like.

The present disclosure does not particularly limit the flexible hardened material and the rigid hardened material. According to some embodiments of the present disclosure, the plurality of layers of flexible hardened material 202 and the plurality of layers of rigid hardened material 201 each include a composite formed of a siloxane polymer material and a resin material. In this case, the plurality of layers of flexible hardened material 202 and the plurality of layers of rigid hardened material 201 having different hardnesses can be formed by adjusting the ratio of the siloxane polymer material to the resin material in the composite, respectively.

According to some embodiments of the present disclosure, the plurality of layers of flexible hardened material 202 may have a pencil hardness not greater than 7H, and the plurality of layers of rigid hardened material 201 may have a pencil hardness greater than 7H and not greater than 9H.

According to some embodiments of the present disclosure, the hardened layer 2 may have a thickness of 8 μm to 15 μm, for example, may be 10 μm.

According to a further embodiment of the present disclosure, in addition to the substrate layer and the hardened layer described above, the cover plate further includes an ink blocking layer attached to the hardened layer, the ink blocking layer including a first ink layer portion located in the bending zone, the first ink layer portion including a mixture of a flexible ink material and a rigid ink material. FIG. 3 schematically shows the ink blocking layer 3 and the first ink layer portion 30 of the ink blocking layer 3. The first ink layer portion 30 in the ink blocking layer 3 includes a flexible ink material, which can correspond to and cooperate with the first hardened layer portion of the hardened layer, to enhance the flexibility and bending properties of the cover plate.

According to a further embodiment of the present disclosure, as shown in FIG. 3, the first ink layer portion of the ink blocking layer of the cover plate includes a plurality of layers of flexible ink material 302 and a plurality of layers of rigid ink material 301, the plurality of layers of flexible ink material 302 and the plurality of layers of rigid ink material 301 are alternately arranged on the hardened layer 2 along the interface between the ink blocking layer 3 and the hardened layer 2.

Further, according to some embodiments of the present disclosure, in a vertical direction perpendicular to the interface between the ink blocking layer 3 and the hardened layer 2, the plurality of layers of flexible ink material 302 in the ink blocking layer is aligned respectively with the plurality of layers of flexible hard material 202 in the hardened layer, and the plurality of layers of rigid ink material 301 in the ink blocking layer is aligned respectively with the plurality of layers of rigid hardened material 201 in the hardened layer. As such, it can facilitate the consistency of the stiffness variations of the hardened layer 2 and the ink blocking layer 3, and is advantageous for improving the flexibility and bending performance of the entire cover plate. In the example of FIG. 3, the ink blocking layer 3 further includes a second ink layer portion 31 located in the non-bending zone, and the second ink layer portion 31 being formed of the rigid ink material.

According to some embodiments of the present disclosure, the plurality of layers of flexible ink material 302 may have a pencil hardness not greater than 7H, and the plurality of layers of rigid hardened material 301 may have a pencil hardness greater than 7H and not greater than 9H.

Further, in some embodiments, the plurality of layers of flexible ink material 302 has an elastic modulus of 6 GPa to 7 GPa, and the plurality of layers of rigid ink material 301 has an elastic modulus of 40 GPa to 60 GPa.

In some embodiments, the thickness of the ink blocking layer 3 is from 12 μm to 16 μm.

Figure 4:
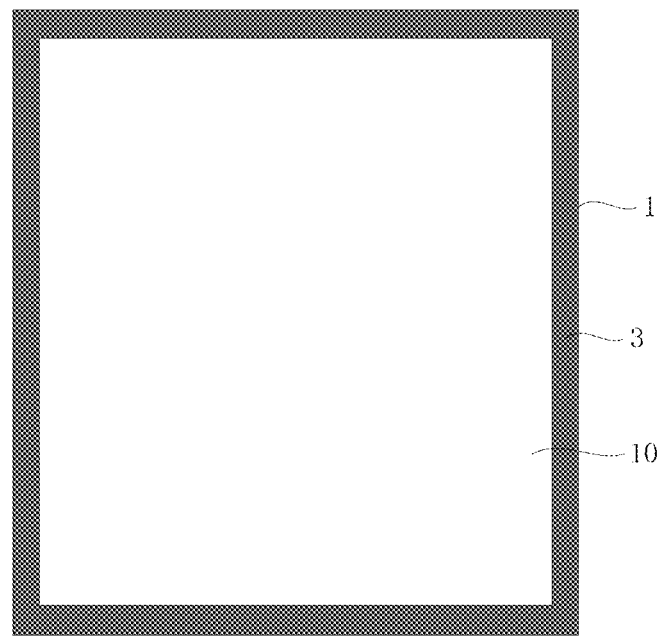
FIG. 4 is a top plan view showing a cover plate provided according to another embodiment of the present disclosure.

For the ink blocking layer mentioned in the embodiments of the present disclosure, it may be arranged outside the display area of the flexible display device. As shown in FIG. 4, the transparent substrate layer 1 includes a display area 10; the ink blocking layer 3 is arranged around the display area 10 for shielding structures such as lines outside the display area 10.

Figure 5:
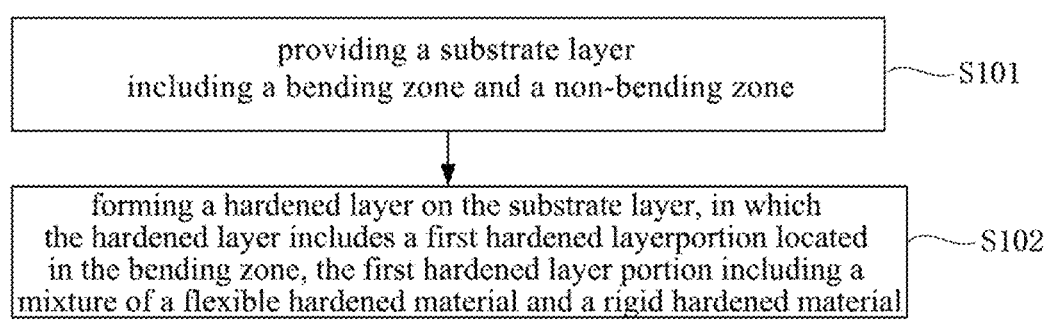
FIG. 5 is a flow chart showing a method for preparing a cover plate provided according to still another embodiment of the present disclosure.

Based on the cover plate provided by the embodiment of the present disclosure, another embodiment of the present disclosure provides a method for preparing a cover plate. As shown in FIG. 5, the method includes the following steps: S101, providing a substrate layer, the substrate layer including a bending zone and a non-bending zone; S102, forming a hardened layer on the substrate layer, in which the hardened layer includes a first hardened layer portion at the bending zone, the first hardened layer portion including a mixture of a flexible hardened material and a rigid hardened material.

According to an embodiment of the present disclosure, a hardening layer may be formed on a substrate layer by an evaporation process, and the method includes: evaporating the rigid hardened material on the bending zone and the non-bending zone of the substrate layer by using a first mask, the rigid hardened material on the non-bending zone of the substrate layer forms the second hardened layer portion of the hardened layer; and evaporating the flexible hardened material on the bending zone of the substrate layer by using a second mask, in which a pattern of the first mask is complementary to a pattern of the second mask. As such, the hardened layer 2 having the plurality of layers of flexible hardened material 202 and the plurality of layers of rigid hardened material 201 as shown in FIG. 3 can be produced.

Further, according to some embodiments of the present disclosure, a method for preparing the cover plate further includes: forming an ink blocking layer on the hardened layer, the ink blocking layer including a first ink layer portion located on the first hardened layer portion, the first ink layer portion including a mixture of a flexible ink material and a rigid ink material.

According to some embodiments of the present disclosure, the ink blocking layer includes a second ink layer portion located on the second hardened layer portion, in which the forming the ink blocking layer includes: printing the rigid ink material on the first hardened layer portion and the second hardened layer portion by using a first screen printing screen; and printing the flexible ink material on the first hardened layer portion by using a second screen printing screen, in which a pattern of the first screen printing screen is complementary to a pattern of the second screen printing screen. By using these process steps, a hardened layer 3 having the plurality of layers of flexible ink material 302 and the plurality of layers of rigid ink material 301 as shown in FIG. 3 can be produced.

According to an embodiment of the present disclosure, after printing the rigid ink material with the first screen printing screen, and after printing the flexible ink material with the second screen printing screen, the rigid ink material and the flexible ink material can be cured by baking heat curing. A further embodiment of the present disclosure also provides a display panel including the cover plate of any of the above embodiments. The above display panel is a flexible display panel, and may be, for example, a flexible OLED display panel.

In addition, an embodiment of the present disclosure further provides a display device including the display panel in the above embodiment. The above display device is a flexible display device, and may be, for example, a flexible OLED display device.

It will be apparent to those skilled in the art that various modifications and changes can be made in the embodiments of the present disclosure without departing from the spirit and scope of the disclosure. Thus, if such modifications and variations of the present disclosure belong to the scope of the appended claims and equivalents thereof herein, the present application is intended to cover these modifications and variations.

What is claimed is:

1. A cover plate, comprising a bending zone and a non-bending zone, wherein the cover plate comprises:

a substrate layer and a hardened layer attached to the substrate layer, wherein the hardened layer comprises a first hardened layer portion located in the bending zone, the first hardened layer portion comprising a mixture of a flexible hardened material and a rigid hardened material, and wherein the cover plate further comprises:

an ink blocking layer attached to the hardened layer, the ink blocking layer comprising a first ink layer portion located in the bending zone, the first ink layer portion comprising a mixture of a flexible ink material and a rigid ink material.

2. The cover plate of claim 1, wherein an upper surface and a lower surface of the substrate layer are each provided with the hardened layer, the first hardened layer portion comprises a plurality of layers of flexible hardened material and a plurality of layers of rigid hardened material, the plurality of layers of flexible hardened material and the plurality of layers of rigid hardened material are arranged alternately on the substrate layer along an interface between the substrate layer and the hardened layer.

3. The cover plate of claim 2, wherein the hardened layer further comprises a second hardened layer portion located in the non-bending zone, the second hardened layer portion being formed of the rigid hardened material.

4. The cover plate of claim 2, wherein the plurality of layers of flexible hardened material has a pencil hardness not greater than 7H, and the plurality of layers of rigid hardened material has a pencil hardness greater than 7H and not greater than 9H.

5. The cover plate of claim 2, wherein the plurality of layers of flexible hardened material and the plurality of layers of rigid hardened material each comprise a composite formed of a siloxane polymer material and a resin material.

6. The cover plate of claim 1, wherein the first ink layer portion comprises a plurality of layers of flexible ink material and a plurality of layers of rigid ink material, the plurality of layers of flexible ink material and the plurality of layers of rigid ink material are arranged alternately on the hardened layer along an interface between the ink blocking layer and the hardened layer.

7. The cover plate of claim 6, wherein in a vertical direction perpendicular to the interface between the ink blocking layer and the hardened layer, the plurality of layers of flexible ink material in the ink blocking layer is aligned respectively with the plurality of layers of flexible hard material in the hardened layer, and the plurality of layers of rigid ink material in the ink blocking layer is aligned respectively with the plurality of layers of rigid hardened material in the hardened layer.

8. The cover plate of claim 1, wherein the ink blocking layer further comprises a second ink layer portion located in the non-bending zone, the second ink layer portion being formed of the rigid ink material.

9. The cover plate of claim 1, wherein the plurality of layers of flexible ink material has an elastic modulus of 6 GPa to 7 GPa, and the plurality of layers of rigid ink material has an elastic modulus of 40 GPa to 60 GPa.

10. The cover plate of claim 1, wherein the cover plate comprises a display area, and the ink blocking layer is arranged at a periphery of the display area.

11. A display panel, comprising the cover plate of claim 1.

12. A display device, comprising the display panel of claim 11.

13. A cover plate, comprising a bending zone and a non-bending zone, wherein the cover plate comprises:

a substrate layer and a hardened layer attached to the substrate layer, wherein the hardened layer comprises a first hardened layer portion located in the bending zone, the first hardened layer portion comprising a mixture of a flexible hardened material and a rigid hardened material, and wherein the hardened layer is arranged on a surface of the substrate layer, and the cover plate further comprises:

an ink blocking layer attached to a side of the substrate layer facing away from the hardened layer, the ink blocking layer comprising a first ink layer portion located in the bending zone, the first ink layer portion comprising a mixture of a flexible ink material and a rigid ink material.

14. The cover plate of claim 1, wherein the ink blocking layer further comprises a second ink layer portion located in the non-bending zone, and the second ink layer portion being formed of the rigid ink material.

* * * * *